Sept. 29, 1959     H. KRAUS     2,906,048

ILLUMINATED PICTURE DISPLAY DEVICE

Filed March 6, 1958     4 Sheets-Sheet 1

INVENTOR.
Harold Kraus
BY
L. S. Saulsbury
ATTORNEY

Sept. 29, 1959        H. KRAUS        2,906,048
ILLUMINATED PICTURE DISPLAY DEVICE
Filed March 6, 1958        4 Sheets-Sheet 2
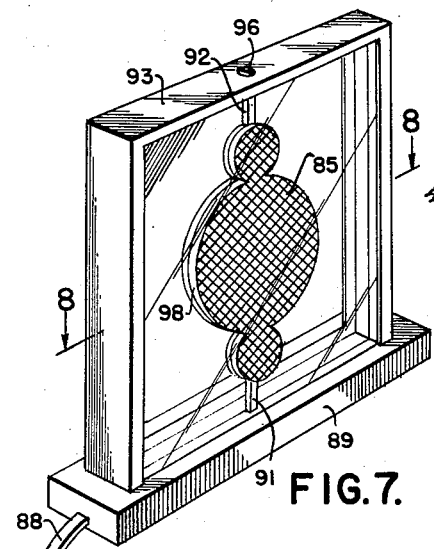
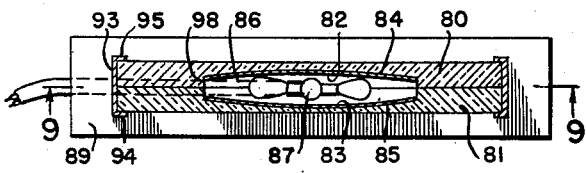
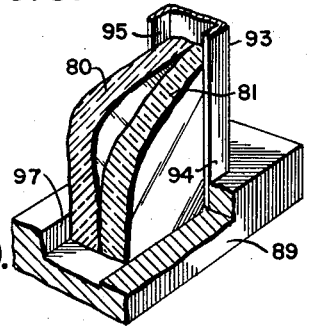
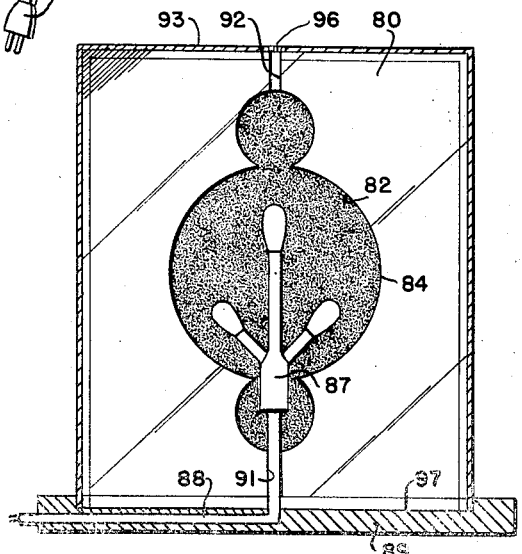
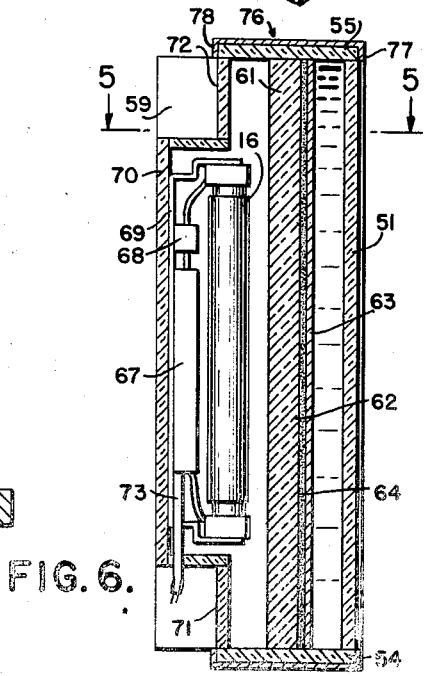
INVENTOR.
Harold Kraus
BY
*L. S. Snellbury*
ATTORNEY

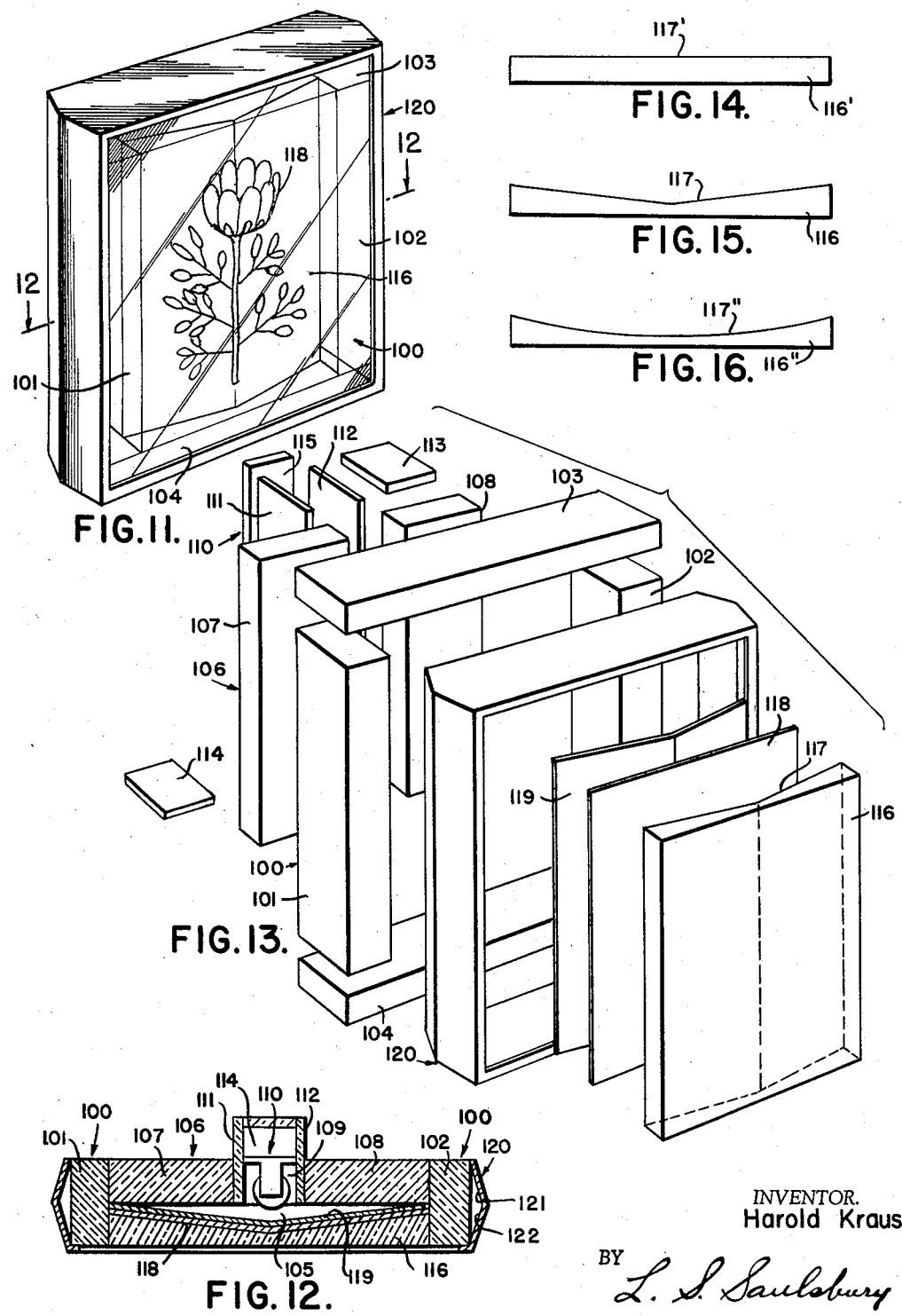

INVENTOR.
Harold Kraus

BY L. S. Saulsbury
ATTORNEY

United States Patent Office 2,906,048
Patented Sept. 29, 1959

1

2,906,048
ILLUMINATED PICTURE DISPLAY DEVICE
Harold Kraus, Teaneck, N.J.
Application March 6, 1958, Serial No. 719,648
7 Claims. (Cl. 40—152.2)

This invention relates to an illuminated picture display device.

It is the principal object of the present invention to provide a picture display device in which the lamp will be disposed directly in the rear of an opaque picture and the light rays transmitted therefrom laterally outwardly against side reflecting surfaces and reflected therefrom inwardly and in front of the picture, and whereby any image showing of the lamp will be eliminated.

It is another object of the invention to provide an illuminated picture display device wherein the picture is lighted from the edges of the device and will have the appearance of floating in space.

It is still another object of the invention to provide an illuminated picture display device in which the light rays will be evenly distributed over the surface of the picture.

It is a further object of the invention to provide an illuminated picture display device in which the lamp assembly is removably disposed within the rear of the device.

It is a still further object of the invention to provide an illuminated picture display device in which the picture element may be embedded or cut in a plastic or molded in a glass body and lighted from a lamp device incorporated in the rear of or within the plastic or glass body.

It is a still further object of the invention to provide an illuminated picture display device in which the lamp assembly located in rear of the picture element and its rays are transmitted through a liquid body and against a mirror surface at the side of the device and reflected inwardly over the picture element lying within the picture medium.

Other objects of the invention are to provide an illuminated picture display device having the above objects in mind, which is of simple construction, has a minimum number of parts, inexpensive to assemble and manufacture, compact, of pleasing appearance, adapted to be supported upon a horizontal surface, efficient and effective in use.

Figure 1:
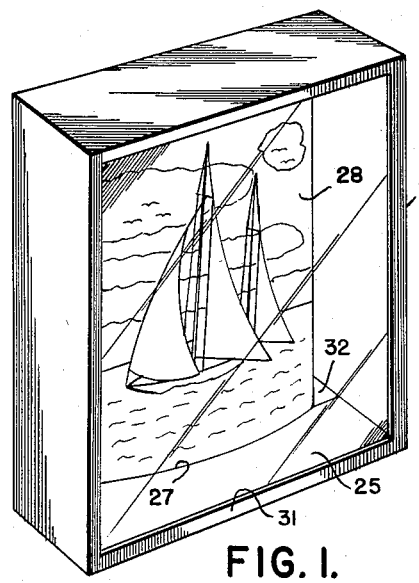
Figure 2:
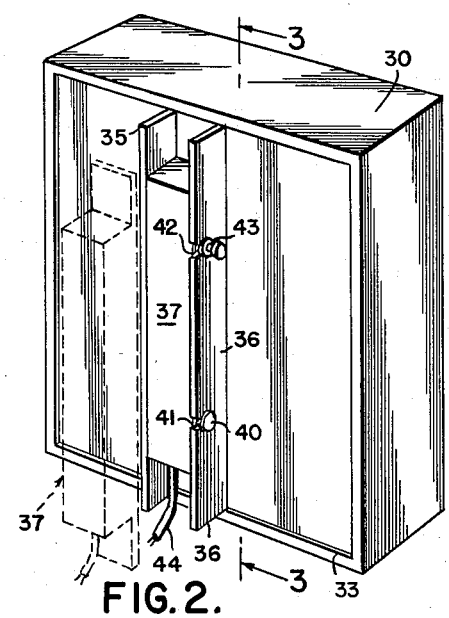
Figure 3:
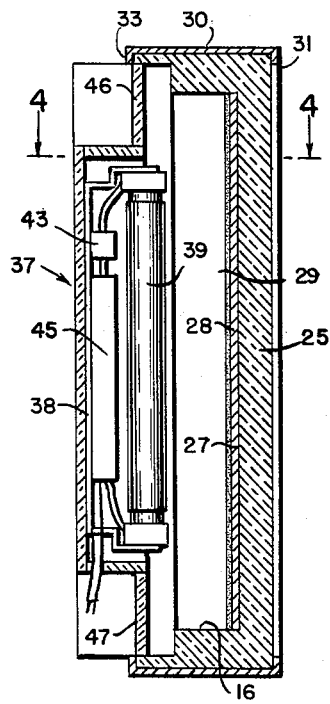
Figure 4:
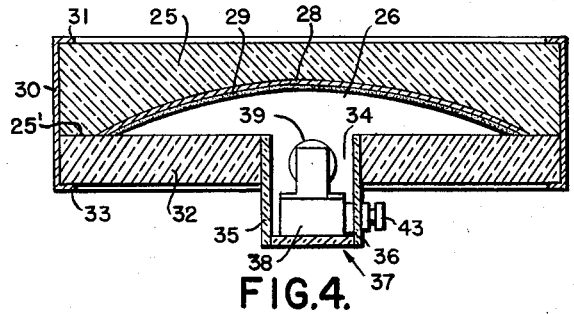
Figure 5:
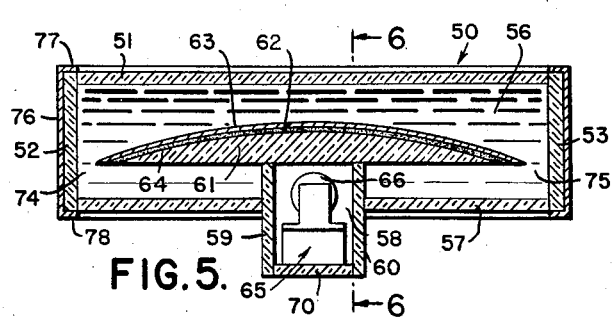

For still other objects, and for a better understanding of the invention, reference may be had to the following detailed description taken in connection with the accompanying drawing, in which Figure 1 is a front perspective view of an illuminated picture display device according to one form of the invention, Fig. 2 is a rear perspective view thereof with illustration made as to the manner in which the lamp fixture is inserted and removed from the rear of the device, Fig. 3 is an enlarged vertical sectional view taken on line 3—3 of Fig. 2, Fig. 4 is an enlarged transverse sectional view taken on line 4—4 of Fig. 3, Fig. 5 is a transverse sectional view of an illuminated picture display device constructed according to another form of the invention in which a transparent liquid is employed as the light transmitting medium, the view being taken on line 5—5 of Fig. 6,

2

Figure 17:
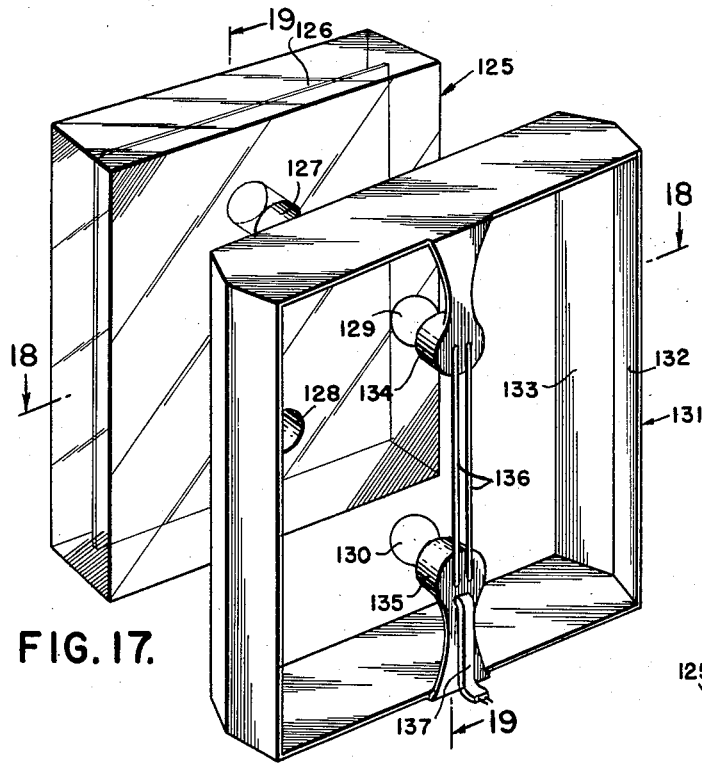
Figure 18:
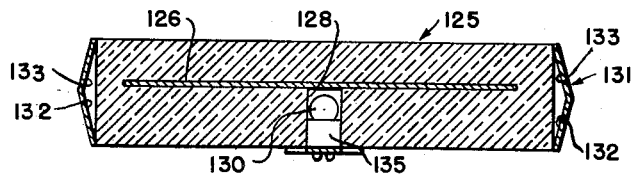
Figure 19:
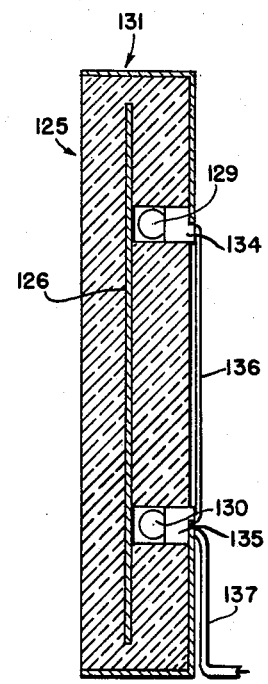

Fig. 6 is a vertical sectional view of the liquid filled picture display device as viewed on line 6—6 of Fig. 5, Fig. 7 is a perspective view of an illuminated picture display device constructed according to still another form of the invention in which the display is cut into the plastic material from which the device is made, Fig. 8 is a transverse sectional view taken on line 8—8 of Fig. 7, Fig. 9 is a vertical sectional view taken on line 9—9 of Fig. 8, Fig. 10 is a fragmentary perspective view of a bottom corner of the form of the invention shown in Fig. 7, Fig. 11 is a perspective view of an illuminated picture display device constructed according to a further form of the invention and that has a removable front member to the rear face of which the picture is smoothly adhered, Fig. 12 is a transverse sectional view taken on line 12—12 of Fig. 11, Fig. 13 is an exploded perspective view of the form of the invention shown in Fig. 11, Figs. 14, 15 and 16 are respectively top edge views of different shape front pieces to which the picture is adhered and that may be used in the form of the invention shown in Fig. 11, Fig. 17 is an exploded view of an illuminated picture display device constructed according to a still further form of the invention and in which the picture is embedded in a single transparent body piece and the lamp bulbs are carried directly by the edge reflector frame, Fig. 18 is a transverse sectional view of the form of the invention shown in Fig. 17 with the parts thereof assembled together, the view being taken generally upon line 18—18 of Fig. 17, and Fig. 19 is a vertical sectional view taken on line 19—19 of Fig. 17.

Referring now particularly to Figs. 1 to 4, 25 represents a thick front piece of transparent plastic or glass having a central recess 26 and a picture engaging face 27 transversely curved as best seen in Fig. 4 and to which a picture 28 is smoothly adhered. An opaque coating layer 29 is spread upon the rear of the picture to prevent light rays from passing directly therethrough. A metal reflector frame 30 with a front flange 31 is extended over the front piece 25 so that the flange 31 abuts the front face thereof. A transparent rear piece assembly 32 of the same width and height as the front piece is fitted into the metal reflector frame 30 and in flush engagement with the rear face of the front piece 25. A rear flange 33 of the reflector frame 30 is bent over the rear piece assembly 32 to hold the assembled pieces together. To render the assembled pieces more homogeneous and of the same refractive index in the portions thereof through which the light is transmitted and to eliminate the possibility of the light being distorted by air space therebetween, the parts are preferably joined together at 25' by an adhesive.

The rear piece assembly 32 has a vertical opening 34 from the sides of which opposing transparent members 35 and 36 extend rearwardly. A fluorescent lamp assembly 37 including a cover 38 and a lamp 39 is removably secured in place in the opening 34 by a clamp screw 40 entering a slot 41 in the member 36 and a switch 43 entering a slot 42 and by which the lamp 39 can be turned on or off. A wire cord 44 extends from the lower end of the lamp assembly 37 and will have a plug by which it is connected to a wall outlet to supply electric current thereto. A lamp ballast 45 is supported on the cover 38. The lamp assembly 37 has upper and lower extensions 46 and 47 serving to fill the upper and lower ends of the opening 34 and are opaque to prevent light from being extended rearwardly from the opening 34.

When the lamp 39 is turned on, rays will pass laterally through the back piece 32 to the side edges thereof and be reflected inwardly by the inner face of the reflector frame 30 through the front piece 25 and over the face of the picture 28. The picture will be uniformly lighted without glare and will appear to be floating in space. Since there is an opaque layer 29 over the picture 28 the light rays are obliged to pass only laterally thereover and the image of the lamp bulb is prevented from appearing in the picture, a beautiful and pleasing picture effect is thus had.

In Figs. 5 and 6, there is shown a form of the invention in which the thick pieces of plastic or glass are eliminated and the media for transmitting the light rays is provided by oil or other suitable liquid. By using a thin transparent shell 50 and the liquid, the weight and the cost of the item may be reduced. This closed transparent shell 50 is formed of a front piece 51, side pieces 52, 53, bottom and top pieces 54 and 55, and a back assembly 57 all adhered together to provide an internal space 56 in which oil or other transparent liquid is disposed. The back assembly 57 has an opening 58 with transparent opposing side pieces 59 and 60. These side pieces 59 and 60 extend inwardly and support an opaque vertically-extending picture supporting member 61 that has a rounded front surface to which a picture 63 is smoothly adhered by adhesive 64.

A fluid tight connection is effected between the members 59, 60 and 61 to prevent leakage of the liquid into the opening 58 in which a lamp assembly 65 is removably disposed. This lamp assembly 65 includes a fluorescent lamp tube 66, a ballast 67, a switch 68, a mounting bracket 69 by which the assembly is secured upon a plastic cover 70. This cover 70 has inwardly extending lower and upper cover portions 71 and 72 so that the lamp assembly when disposed within the opening 58 is wholly enclosed therein. An electric current supply cord 73 extends downwardly through the lower end of the cover and the lower portion 71 will have a plug thereon for the connection of the lamp with a wall outlet.

It will be noted that the central picture mounting member 61 is of considerably less width and thickness than the interior of the shell 50 and has thin side edges that are spaced as indicated at 74 and 75 from the respective shell side members 52 and 53 so that the oil lies fully around the side edges of the picture supporting member 61.

Surrounding the shell 50 and over the side, top and bottom members is a metal reflector frame 76 flanged at 77 and 78 to hold it upon the shell 50. This frame has an internal mirror surface and surrounds the entire shell. Light rays are projected from the lamp tube 66 laterally outwardly through the respective supporting members 59 and 60, the oil, the side members 52 and 53 and against the internal mirror surface of the reflector frame 76 and will be laterally reflected into the oil and in front of and over the exterior of the picture 63 whereby to provide a clear view of the picture showing only the picture area lighted and that will appear as if it is floating in the interior of the shell and without any image of the lamp tube being portrayed.

Referring now particularly to Figs. 7, 8, and 9 and 10, 80 and 81 represent respectively two transparent plastic or glass half parts having respectively similarly recesses 82 and 83 cut or molded to a desired shape or configuration and coated respectively with opaque material 84 and 85. The parts 80 and 81 are joined by aligning them so that the recesses provide a central space 86 in which is disposed a lamp bulb assembly 87 having a cord 88 that extends downwardly and through a bottom base 89. The cord has a plug 90 adapted to be connected to an electric wall outlet. The parts 80 and 81 are recessed or cut at 91 to accommodate the cable 88 as it leads from the space 86. In order that the plastic or glass is not overheated a vent passage 92 is similarly provided at the top of the parts. The pieces are preferably held together by an adhesive adjoining their faces and having the same refracture index as the parts. A mirror frame 93 extends over the top edge and down the sides and is held there over by flanges 94 and 95. The top of the reflector frame has a vent hole 96 that registers with the vent passage 92. The sides of the frame depend with the lower edges of the parts 80 and 81 into a depression 97 in the top of the base 89 so as to be retained therein.

While the inner faces of the recesses 82 are coated with opaque material the joined edges of the recesses and about the central space as indicated at 98 are transparent. The light rays from the lamp bulb assembly 87 pass laterally outwardly therethrough and will be reflected from the internal mirror face of the mirror frame 93 laterally inwardly through the parts and over the coatings without displaying the image of the lamp bulb assembly. An outline of the recesses on the front and rear of the picture construction and the configuration will have the appearance of floating in space. The picture will be well lighted and has a pleasing and ornamental appearance. The coatings 84 and 85 can be replaced by pictures and a picture would be displayed on both the front and rear of the construction.

Referring now particularly to Figs. 11 to 16, there is shown a still further form of the invention wherein there is a removable front piece to the rear face of which the picture is attached. A thick transparent frame 100 is formed of transparent members 101, 102, 103 and 104 rigidly joined together by adhesive at their ends to provide a central space 105. A rear assembly 106 is formed of two transparent side pieces 107 and 108 that are spaced from one another to provide an opening 109 for a lamp tube assembly 110. The sides of the opening are provided with vertically-extending opposing transparent plates 111 and 112 that are held in laterally-spaced relation by top and bottom members 113 and 114 and a back plate 15. All of the rear assembly pieces and plates are adhesively secured together to provide a rigid structure and is adhered to the rigid frame 100 to thereby provide a composite main assembly.

The front of the frame 100 is filled with a removable picture supporting front piece 116 which has a depressed surface 117 on its rear face against which a picture 118 is depressed and secured by an adhesive. A rigid and opaque backing sheet 119 for the picture is adhered to the picture and is shaped to conform to the depressed rear face 117 of the front piece 116, Fig. 15. The front piece may if desired be without a depressed rear face and be flat on its inner face as provided by an alternative front piece 116′ with flat face 117′, Fig. 14, or the rear face can be curved as shown at 117″ on a frontpiece 116″, Fig. 16.

About the frame 100, the back assembly 106 and the removable picture supporting piece 116, there is extended a reflector frame 120 having converging inner mirror surfaces 121 and 122 on the inner face thereof by which the light rays are reflected.

The light rays from the lamp assembly 110 in the opening 109 are transmitted laterally outwardly through the plates 111, 112, rear members 107 and 108 and frame members 101 and 102 to impinge the converging mirror surfaces 121 and 122 of the reflector frame 120 so that the light rays are reflected over the front of the picture 118 to portray the same. The picture as in the other forms of the invention will have the same appearance as though it is floating in space. The image of the lamp assembly 110 will have been prevented from passing through the picture by the opaque backing sheet 119.

Referring now particularly to Figs. 17, 18 and 19, there is shown a still further and a preferred form of the invention wherein the number of parts have been minimized. According to this form of the invention there is provided a relatively thick molded transparent plastic or block glass 125 in which an opaque picture element 126 has been embedded. This piece 125 has vertically-spaced holes 127 and 128 in the rear thereof for receiving respectively lamp bulbs 129 and 130. These lamp bulbs are mounted respectively on a mirror reflector frame 131 that is adapted to be fitted over and about the sides of the block 125. This rear frame has converging internal mirror surfaces 132 and 133 on the sides thereof by which light rays are received and reflected laterally through the block 125. The respective lamp bulbs 129 and 130 are carried in respective sockets 134 and 135 by the reflector frame 131. Wires 136 extend between the sockets 134 and 135 and a cord 137 that will have a plug for connection with a wall receptacle to supply electric current to the lamp bulbs 129 and 130. The mirror reflector frame 131 is merely slipped over the block 125 from the rear thereof. The light rays from the lamp bulbs 129 and 130 will pass laterally outwardly and will be reflected from the mirror frame surfaces 132 and 133 laterally inwardly over the front of the picture element 126. The picture element will be evenly lighted and no image of the lamp bulb will be present.

While various changes may be made in the detail construction, it shall be understood that such changes shall be within the spirit and scope of the present invention as defined by the appended claims.

What is claimed is:

1. An illuminated picture display device comprising a transparent body having a front face and a central rear opening, a picture element disposed in the body in front of the opening and in rear of the front face, said picture element terminating short of the sides of the transparent body, a lamp assembly lying within the opening, said picture element being rendered opaque from the lamp assembly, and a reflector frame lying about the sides of the transparent body having internal reflecting surfaces adapted to receive light rays from the lamp assembly through the transparent body and to reflect the rays over the front of the picture element, whereby the picture will be illuminated from the front thereof without the lamp image being displayed.

2. An illuminated picture display device as defined in claim 1, and said transparent body including a rear piece and a front piece having a depressed rear surface, said picture element lying against the depressed rear surface of the front piece, and a rear assembly secured to the front piece and said central opening lying therewithin, said reflector frame overlying the edges of the joined body pieces to hold the same together.

3. An illuminated picture display device as defined in claim 1, and said transparent body being in the form of a liquid tight shell, a picture supporting member having a curved front face, said shell having plate members extending forward from the rear thereof and along the sides of the opening and said picture supporting member being supported thereupon in spaced relation from the front and rear of the shell and a liquid light transmitting medium within the shell and about the picture supporting member whereby the rays of light will be transmitted to a liquid medium against the mirror surfaces and reflected therethrough over the picture face.

4. An illuminated picture display device as defined in claim 1, and said transparent body including front and rear transparent pieces, said picture being in the form of a configuration cut into at least one of the pieces and providing a space therein, said lamp assembly lying within said space, said configuration being opaque except for the sides thereof through which the light rays may pass.

5. An illuminated picture display device as defined in claim 1, and said transparent body including front and rear transparent pieces, said picture being in the form of a configuration cut into bottom of the pieces and providing a space therebetween, said lamp assembly lying within the space, said configurations being opaque except for their sides thereof and through which the light rays may pass.

6. An illuminated picture display device as defined in claim 1, and said transparent body including as assembled shell with a rear assembly therein and a removable front piece having an inner face against which the picture element may be pressed and upon the front piece being removed the picture element may be replaced.

7. An illuminated picture display device as defined in claim 1, and said picture element being embedded in the transparent body, and said lamp assembly being carried by the reflector frame.

References Cited in the file of this patent

UNITED STATES PATENTS

| 2,548,126 | Sholkin | Apr. 10, 1951 |
| 2,560,117 | Mallary | July 10, 1951 |
| 2,561,885 | Prideaux | July 24, 1951 |

FOREIGN PATENTS

| 471,522 | Great Britain | Sept. 7, 1937 |